(12) United States Patent
Chen (10) Patent No.: US 7,599,162 B2
(45) Date of Patent: Oct. 6, 2009

(54) OVERLOAD PROTECTION CONTROL MECHANISM FOR A POWER SUPPLY

(75) Inventor: Michael Chen, Taipei Hsien (TW)

(73) Assignee: Topower Computer Industrial Co., Ltd., Taipei Hsien (TW)

( * ) Notice: Subject to any disclaimer, the term of this patent is extended or adjusted under 35 U.S.C. 154(b) by 414 days.

(21) Appl. No.: 11/580,891

(22) Filed: Oct. 16, 2006

(65) Prior Publication Data

US 2008/0088988 A1    Apr. 17, 2008

(51) Int. Cl.
*H01H 73/00*    (2006.01)
*H02H 9/02*    (2006.01)
*H02H 7/00*    (2006.01)

(52) U.S. Cl. .................... 361/115; 361/93.1; 361/18

(58) Field of Classification Search .............. 361/115, 361/93.1, 18
See application file for complete search history.

(56) References Cited

U.S. PATENT DOCUMENTS 4,667,094 A * 5/1987 Van-Hecke et al. ..... 250/223 R
7,245,515 B2 * 7/2007 Chiang ....................... 363/146

* cited by examiner

*Primary Examiner*—Stephen W Jackson
*Assistant Examiner*—Lucy Thomas
(74) *Attorney, Agent, or Firm*—Muncy, Geissler, Olds & Lowe, PLLC (57) ABSTRACT

The present invention discloses an overload protection control mechanism for a power supply, wherein a control mechanism installed between two connectors automatically switches the DC power states of the output signal of the overload protection circuit according to the electric connection state between two connectors. Thereby, the present invention not only can prevent the user, who lacks the knowledge of the overload protection circuit, from incorrectly operating the overload protection circuit but also can protect electronic devices from the damage induced by that an unintended touch switches the overload protection circuit erroneously.

22 Claims, 11 Drawing Sheets

Fig. 9

OVERLOAD PROTECTION CONTROL MECHANISM FOR A POWER SUPPLY

FIELD OF THE INVENTION

The present invention relates to an overload protection control mechanism for a power supply, particularly to an overload protection control mechanism for a power supply, wherein the electric connection state of connectors determines the DC power state of the output signal of the overload protection circuit.

BACKGROUND OF THE INVENTION

As the user demands higher and higher working speed of a computer, the electric power needed by CPU and the peripheral devices in a computer system grows responsively; therefore, the power supply of the computer system has to provide more power output. To secure users' safety and health, there is a limitation on the power output by a power supply. Currently, the maximum power output (max VA) for a power supply is generally 240VA; for a 12V power supply, the maximum current is thus limited to 20 A. For example, in SSI or UL, it is required that the highest power output by a power supply should not exceed 240VA.

There are various types of control circuits for adjusting power supply current in the market. For example, a R.O.C. patent publication No. 200619915 discloses a power supply control circuit capable of selecting current-limiting modes, wherein under an energy limitation standard, the user can utilize a selection circuit to switch the operation modes of the current-limiting/comparing circuit, including: a one-to-one mode, a one-to-multiple mode, a multiple-to-multiple mode and a multiple-to-one mode, according to different combinations of loads in a single power supply, and different power supplies with different specifications are thus unnecessary.

However, the user has to judge the power usage conditions of back-end electronic devices before he selects the mode of the current-limiting/comparing circuit via the selection circuit. If the user does not understand the power usage conditions of the back-end electronic devices, he is unable to select the mode of the current-limiting/comparing circuit correctly, and the electronic devices will thus not operate normally. Besides, as the selection circuit is a manually-operated switch in practice, an unintended touch will incur the sudden power change of the electronic devices and thus damage the electronic devices.

SUMMARY OF THE INVENTION

The primary objective of the present invention is to provide an overload protection control mechanism for a power supply, which makes the overload protection circuit able to automatically switch the DC power states of its output signal according to the electric connection/disconnection state of connectors; thereby, the overload protection control mechanism of the present invention not only can prevent the user, who lacks the knowledge of the overload protection circuit, from incorrectly operating the overload protection circuit but also can protect electronic devices from the damage induced by that an unintended touch switches the overload protection circuit erroneously.

To achieve the abovementioned objective, the present invention proposes an overload protection control mechanism for a power supply, which comprises: an overload protection circuit and a control mechanism. The overload protection circuit is built inside a power supply and determines the DC power state of its output signal according to the value of the power output by the power supply. The control mechanism further comprises: a first connector, an adapter device and a control element. The first connector is arranged in the output end of the power supply. The adapter device has a second connector, which can be electrically connected to the first connector, and transmits power to a back-end electronic device. The control element is installed in the place where the first connector is electrically connected to the second connector. The control element generates a first signal when the first connector and the second connector are in an electric connection state and generates a second signal when the first connector and the second connector are in an electric disconnection state. When the first signal is input into the overload protection circuit, the overload protection circuit enters a first overload protection mechanism. When the second signal is input into the overload protection circuit, the overload protection circuit enters a second overload protection mechanism.

Another objective of the present invention is to provide an overload protection control mechanism for a power supply, wherein in addition to modularized power supplies, the present invention may also apply to a conventional power supply and makes the overload protection circuit able to automatically switch the DC power states of its output signal.

To achieve the abovementioned objective, the present invention proposes an overload protection control mechanism for a power supply, which comprises: an overload protection circuit and a control mechanism. The overload protection circuit is built inside a power supply and determines the DC power state of its output signal according to the value of the power output by the power supply. The control mechanism further comprising: a first connector, a sixth connector and a control element. The first connector is connected to the output end of the power supply via a first set of cable. The sixth connector is installed on an electronic device and can be electrically connected to the first connector. The control element is installed in the place where the first connector is electrically connected to the sixth connector. The control element generates a first signal when the first connector and the sixth connector are in an electric connection state and generates a second signal when the first connector and the sixth connector are in an electric disconnection state. When the first signal is input into the overload protection circuit, the overload protection circuit enters a first overload protection mechanism. When the second signal is input into the overload protection circuit, the overload protection circuit enters a second overload protection mechanism.

DETAILED DESCRIPTION OF THE PREFERRED EMBODIMENTS

The technical contents of the present invention are to be described in detail in cooperation with the drawings below.

Figure 1:
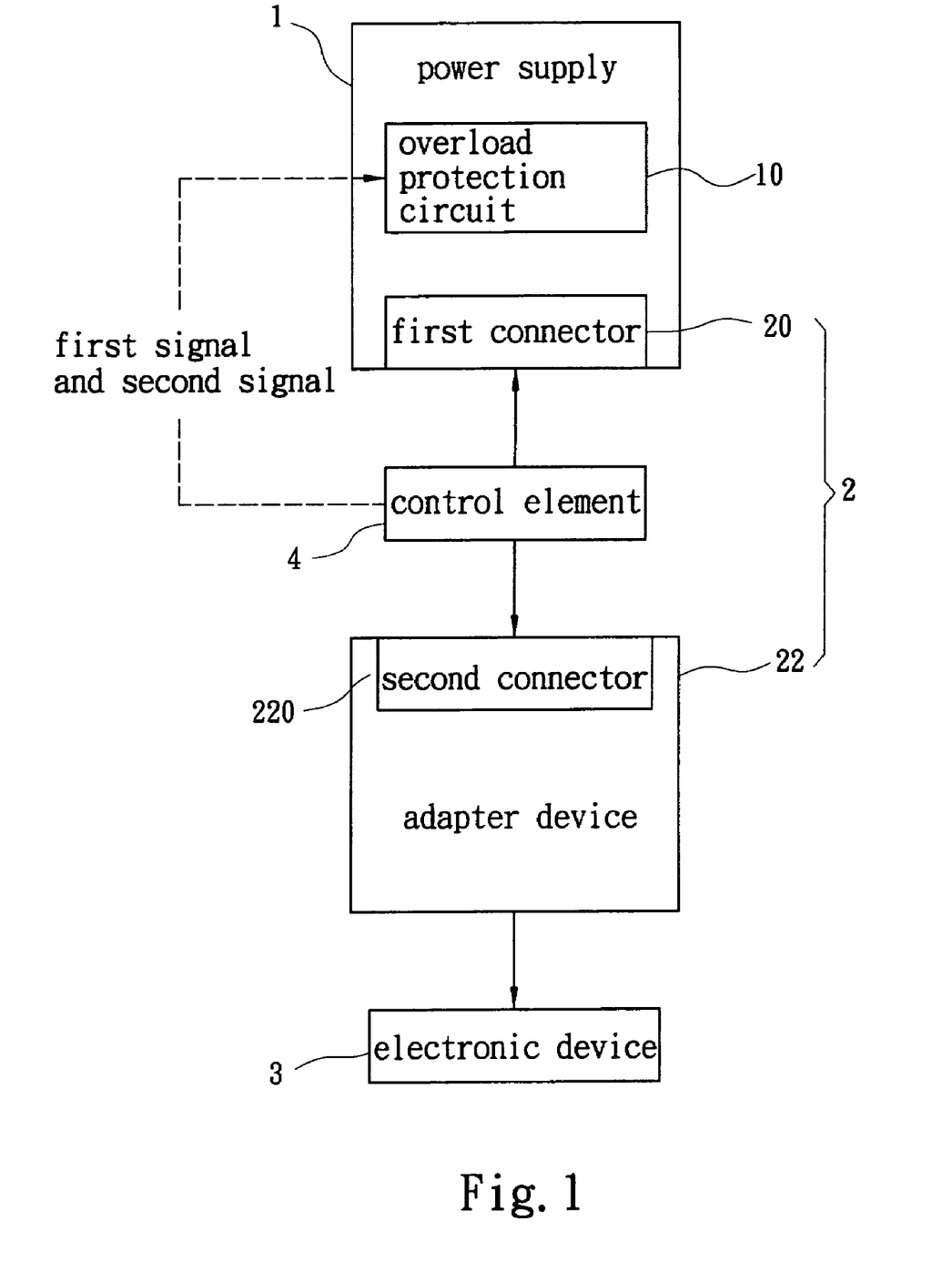
FIG. 1 is a diagram showing the architecture of a first embodiment of the present invention
Figure 2:
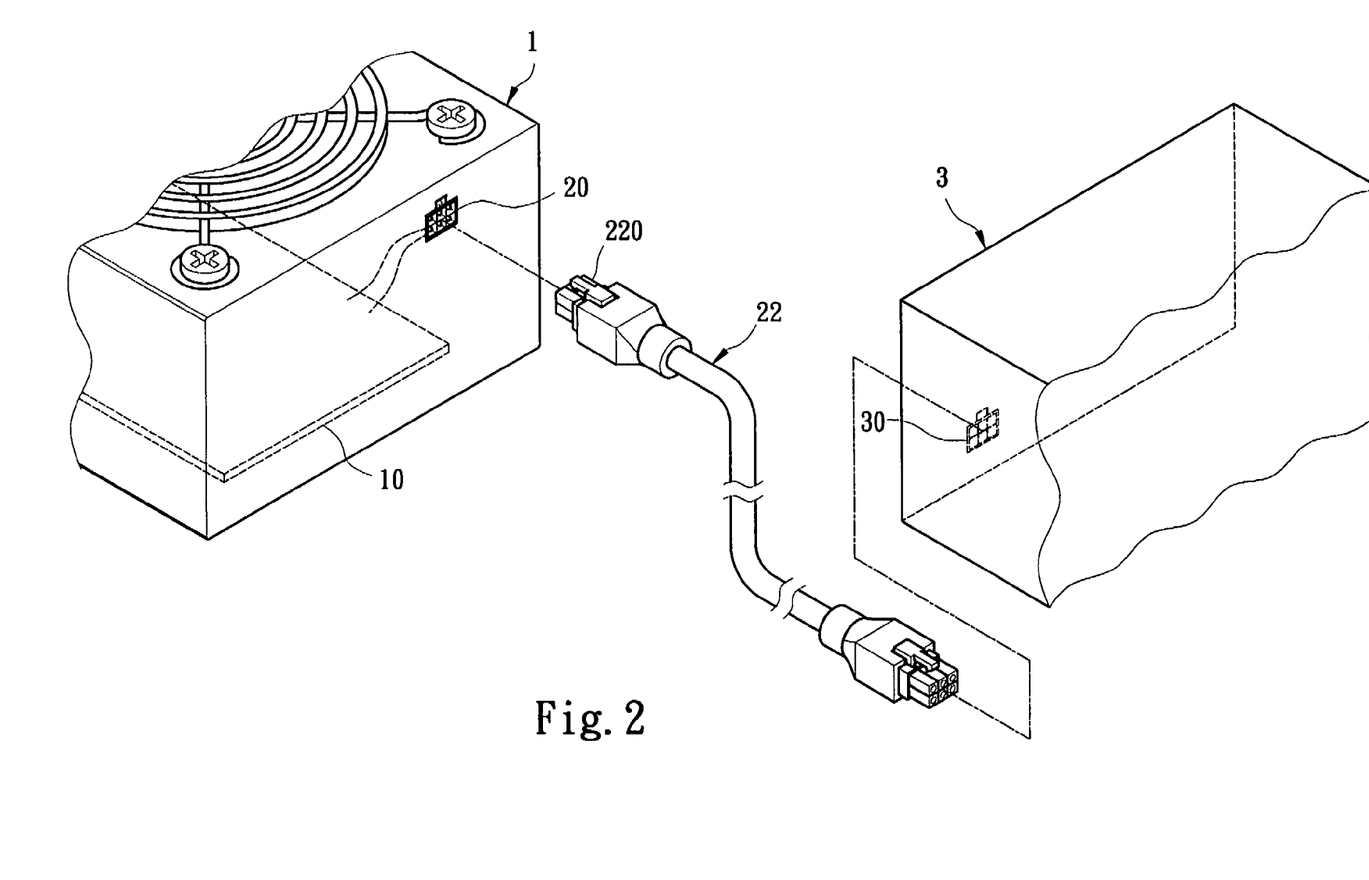
FIG. 2 is a perspective view schematically showing the first embodiment of the present invention.

Refer to FIG. 1 and FIG. 2 respectively a diagram showing the architecture of a first embodiment of the present invention and a perspective view schematically showing the first embodiment of the present invention. The overload protection control mechanism for a power supply of the present invention comprises: an overload protection circuit 10 built inside a power supply 1; and a control mechanism 2 determining whether the overload protection circuit 10 presents a first overload protection mechanism or a second overload protection mechanism.

The overload protection circuit 10 determines the DC power state of its output signal according to the value of the power output by the power supply 1. In this embodiment, the power supply 1 is a modularized power supply, and the DC power states of the output signal of the overload protection circuit 10 include: the normal power output state and the power pause/turn-off state.

The control mechanism 2 further comprises: a first connector 20, an adapter device 22 and a control element 4. The first connector 20 is arranged in the output end of the power supply 1. The adapter device 22 has a second connector 220, which can be electrically connected to the first connector 20, and transmits power to a back-end electronic device 3. The control element 4 is installed in the place where the first connector 20 is electrically connected to the second connector 220. The control element 4 generates a first signal when the first connector 20 and the second connector 220 are in an electric connection state and generates a second signal when the first connector 20 and the second connector 220 are in an electric disconnection state. When the first signal is input into the overload protection circuit 10, the overload protection circuit 10 enters a first overload protection mechanism. When the second signal is input into the overload protection circuit 10, the overload protection circuit 10 enters a second overload protection mechanism. In this embodiment, the first overload protection mechanism and the second overload protection mechanism are respectively referred to the normal power output state and the power pause/turn-off state.

Figure 3:
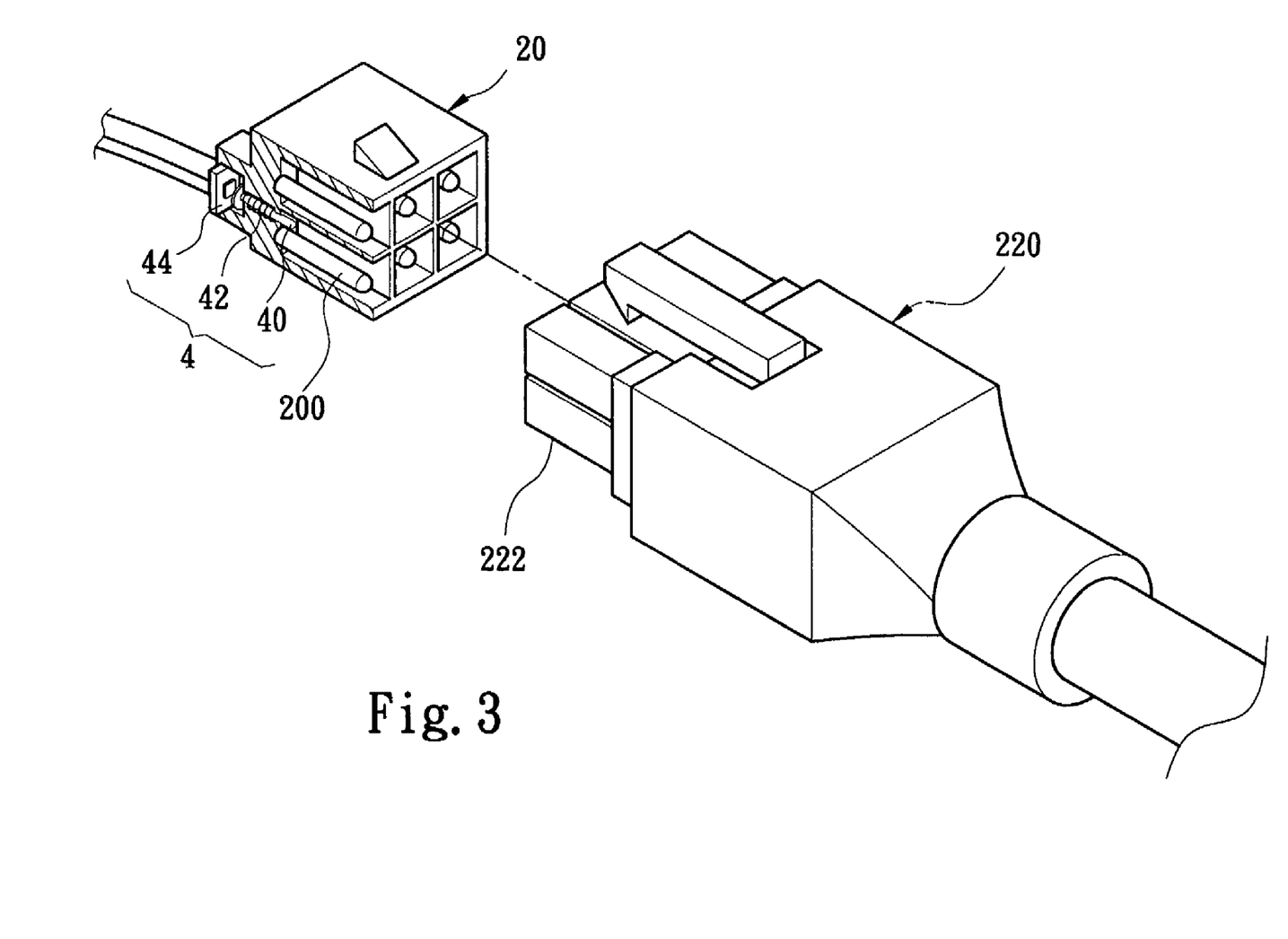
FIG. 3 is a perspective view schematically showing the control element according to the first embodiment of the present invention.

Refer to FIG. 3 a perspective view schematically showing the control element according to the first embodiment of the present invention. The control element 4 is a switch device installed inside a first pin 200 of the first connector 20. The control element 4 further comprises: a movable bar 40, a spring 42 enabling the movable bar 40 to move back and forth and a switch 44. When the control element 4 is free from external force, it generates the first signal. The second connector 220 has a second pin 222 corresponding to the first pin 200. When the control element 4 contacts the inner contact face of the second pin 222, it generates the second signal. In this embodiment, the first connector 20 and the second connector 220 are respectively a 6-pin male connector and a 6-pin female connector. However, the first connector 20/the second connector 220 may also be a 2-pin, 4-pin, 8-pin, 20-pin, or 24-pin male/female connector. Besides, a protrusion (not shown in the drawing) corresponding to the control element 4 may also be installed in the inner contact face of the second pin 222 of the second connector 220 and used to increase the accuracy of contacting the control element 4.

Figure 4:
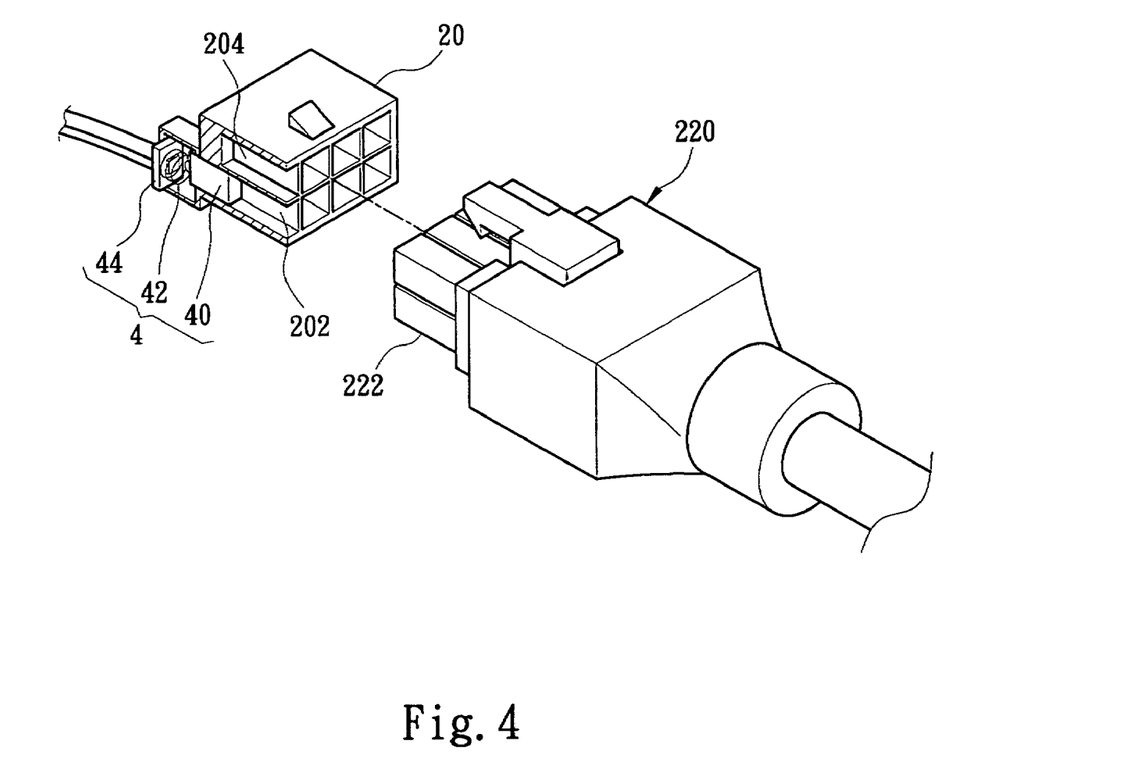
FIG. 4 is a perspective view schematically showing the control element according to a second embodiment of the present invention.
Figure 5A:
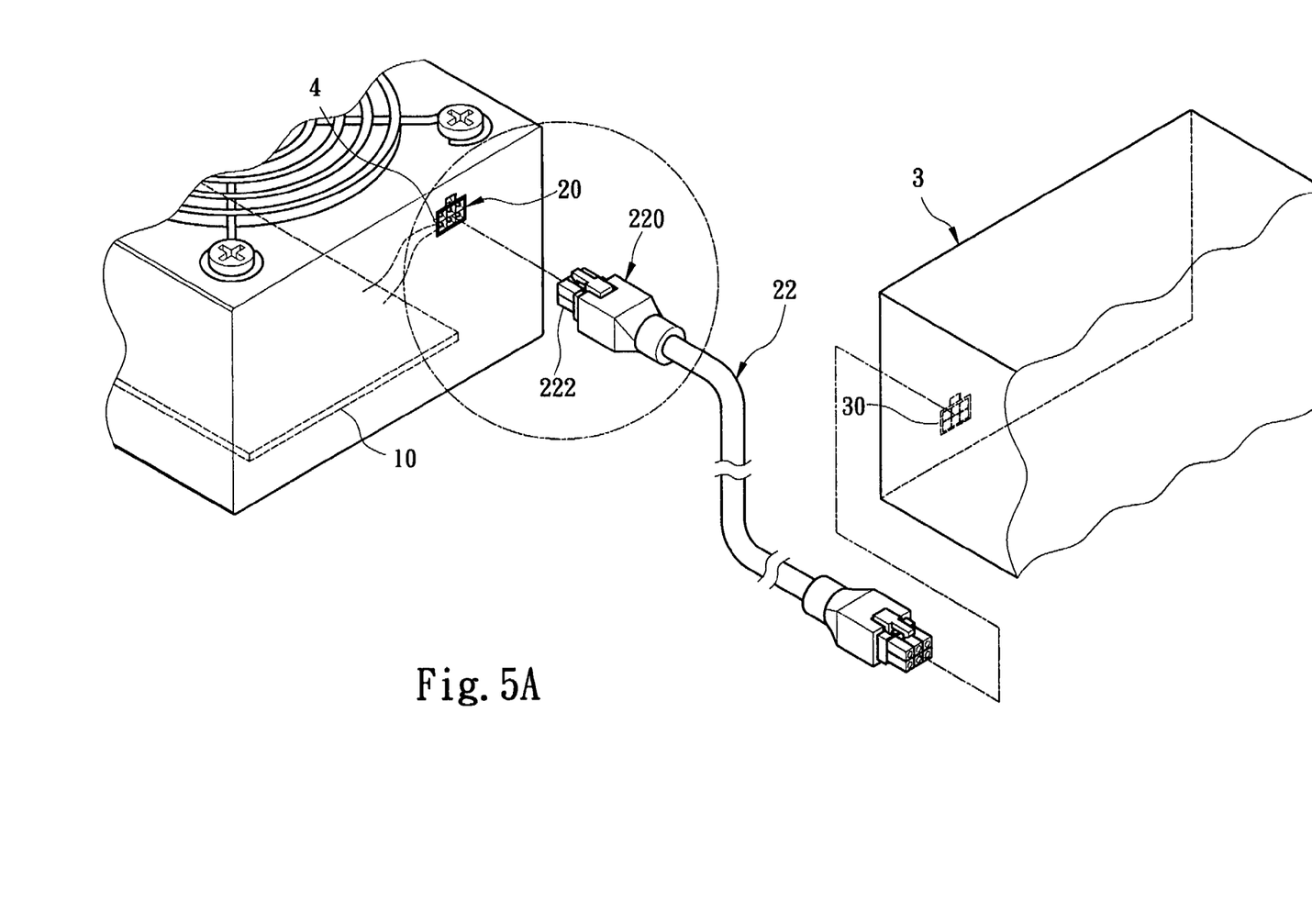
FIG. 5A is a perspective view schematically showing the control element according to a third embodiment of the present invention.
Figure 5B:
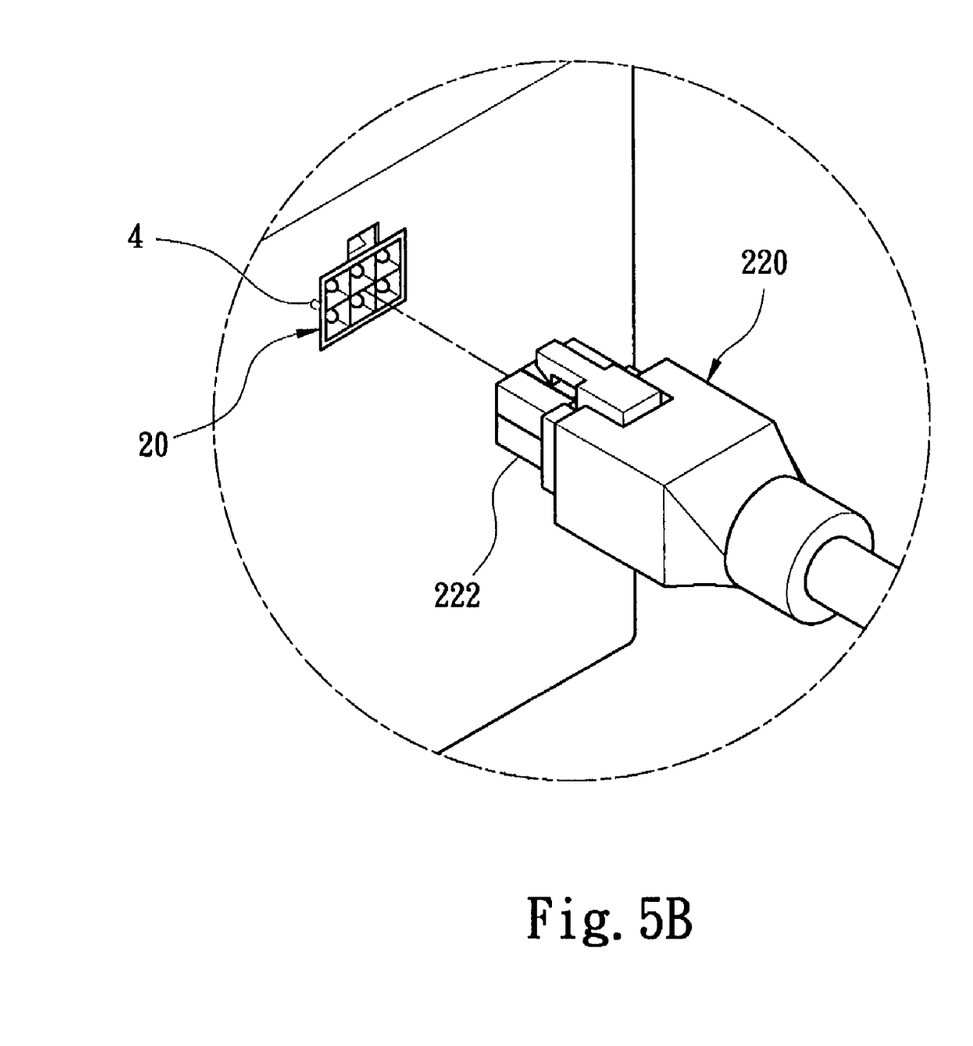
FIG. 5B is an enlarged view schematically showing the control element shown in FIG. 5A.
Figure 5C:
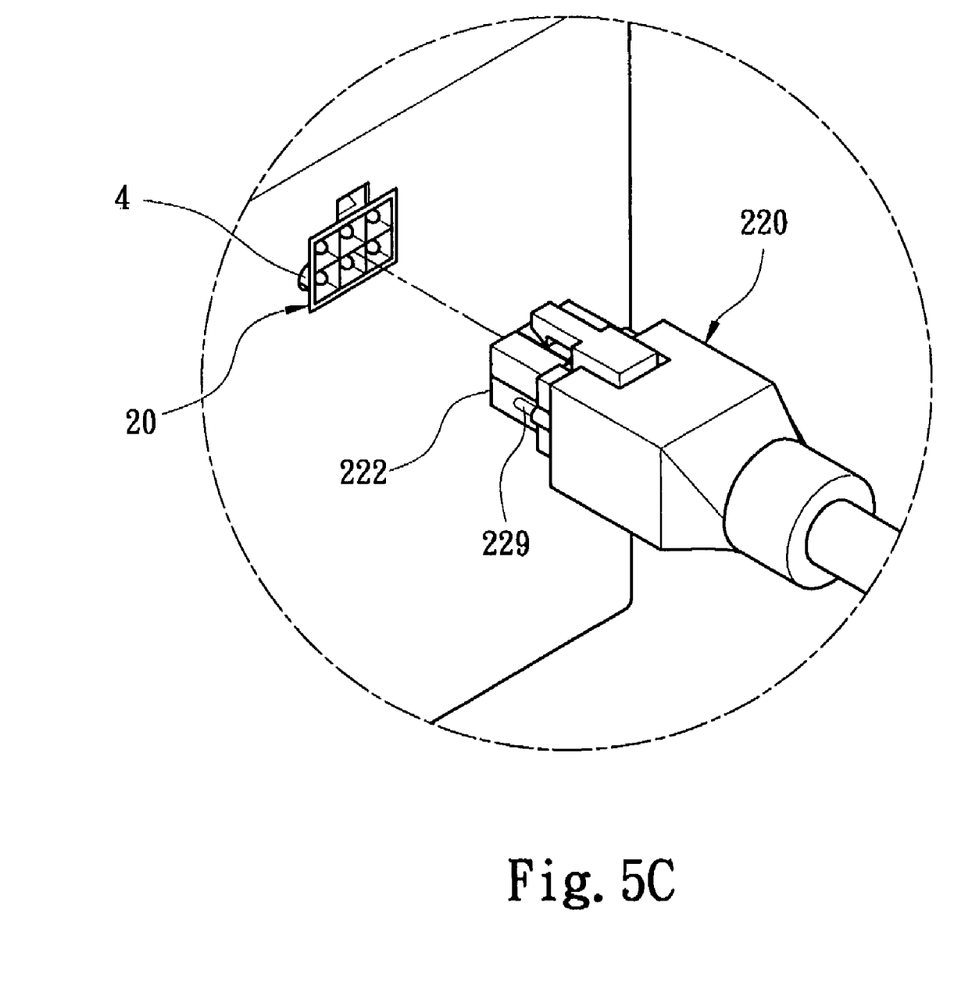
FIG. 5C is an enlarged view schematically showing the control element according to a fourth embodiment of the present invention.

In this embodiment, the control element 4 is installed inside the first pin 200. In practice, the control element 4 may also be installed in a first additional socket 202 or a second additional socket 204, as shown in FIG. 4 a perspective view schematically showing the control element according to a second embodiment of the present invention; correspondingly, a protrusion (not shown in the drawing) may be installed on the second pin 222 to contact the control element 4 more accurately. Refer to FIGS. 5A, 5B and 5C. Further, the section of the second connector 220 may be larger than that of the first connector 20, and the control element 4 may be installed in one side of the first connector 20 on the casing of the power supply 1 and corresponds to the portion by which the second connector 220 is larger than the first connector 20. Besides, the second connector 220 may further has a protrusion 229 to contact the control element 4 more accurately.

The control elements 4 triggers the overload protection circuit 10 to switch between the first and second overload protection mechanism according to the electric connection state or the electric disconnection state of the first and second connectors 20 and 220; thereby, the overload protection circuit 10 can automatically present the normal power output state or the power pause/turn-off state without the judgment and operation of the user. Thus, the present invention not only can prevent the user, who lacks the knowledge of the overload protection circuit 10, from incorrectly operating the overload protection circuit 10 but also can effectively protect the electronic device 3 from the damage induced by that an unintended touch switches the overload protection circuit 10 erroneously.

Figure 6:
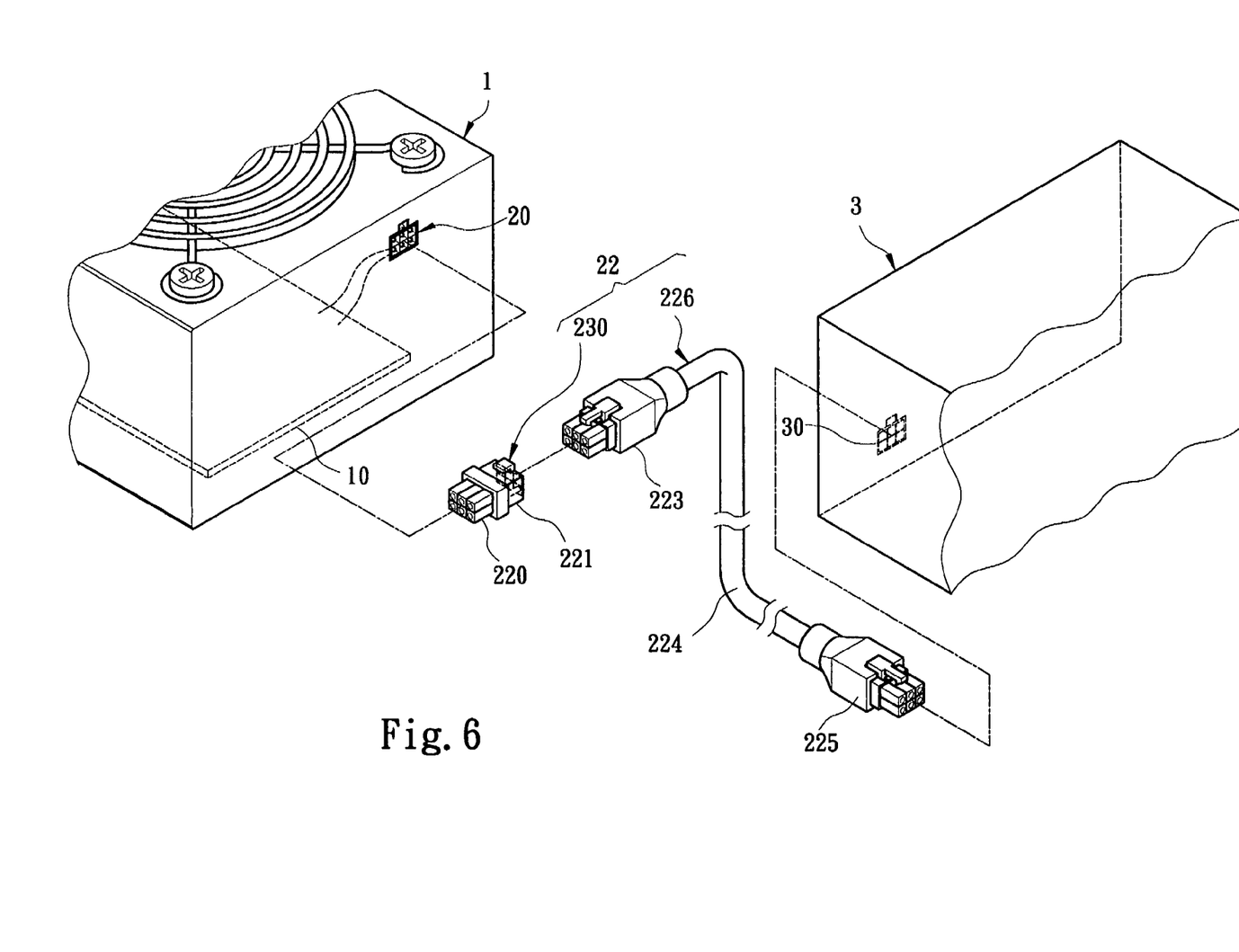
FIG. 6 is a perspective view schematically showing the control element according to a fifth embodiment of the present invention.

Refer to FIG. 6 a perspective view schematically showing a fifth embodiment of the present invention. In this embodiment, the adapter device 22 comprises: an adapter 230 with the second connector 220 and a third connector 221 respectively arranged on both ends thereof, and a power line module 226 having a cable 224 with a fourth connector 223 and a fifth connector 225 respectively arranged on both ends of the cable 224. The third connector 221 can be connected to the fourth connector 223, and the fifth connector 225 can be connected to a sixth connector 30 of the back-end electronic device 3. Similar to that shown in FIG. 3, the control element 4 is also installed inside the first pin 200 of the first connector 20.

In this embodiment, the adapter device 22 comprises the adapter 230 and the power line module 226. In practice, the adapter device 22 may be merely a power line module 227 having the cable 224 with the second connector 220 and the fifth connector 225 respectively arranged on both ends of the cable 224 (Refer to FIG. 2 again).

The adapter device 22, which has the adapter 230 and the power line module 226 or merely has the power line module 227, not only can electrically connect the power supply 1 with the electronic device 3 but also can enable the control element 4 to trigger the overload protection circuit 10. Thereby, the overload protection circuit 10 can switch between the first and second overload protection mechanisms according to the electric connection/disconnection state of the first connector 20 and the second connector 220 without changing the architecture of the electronic device 3.

Figure 7:
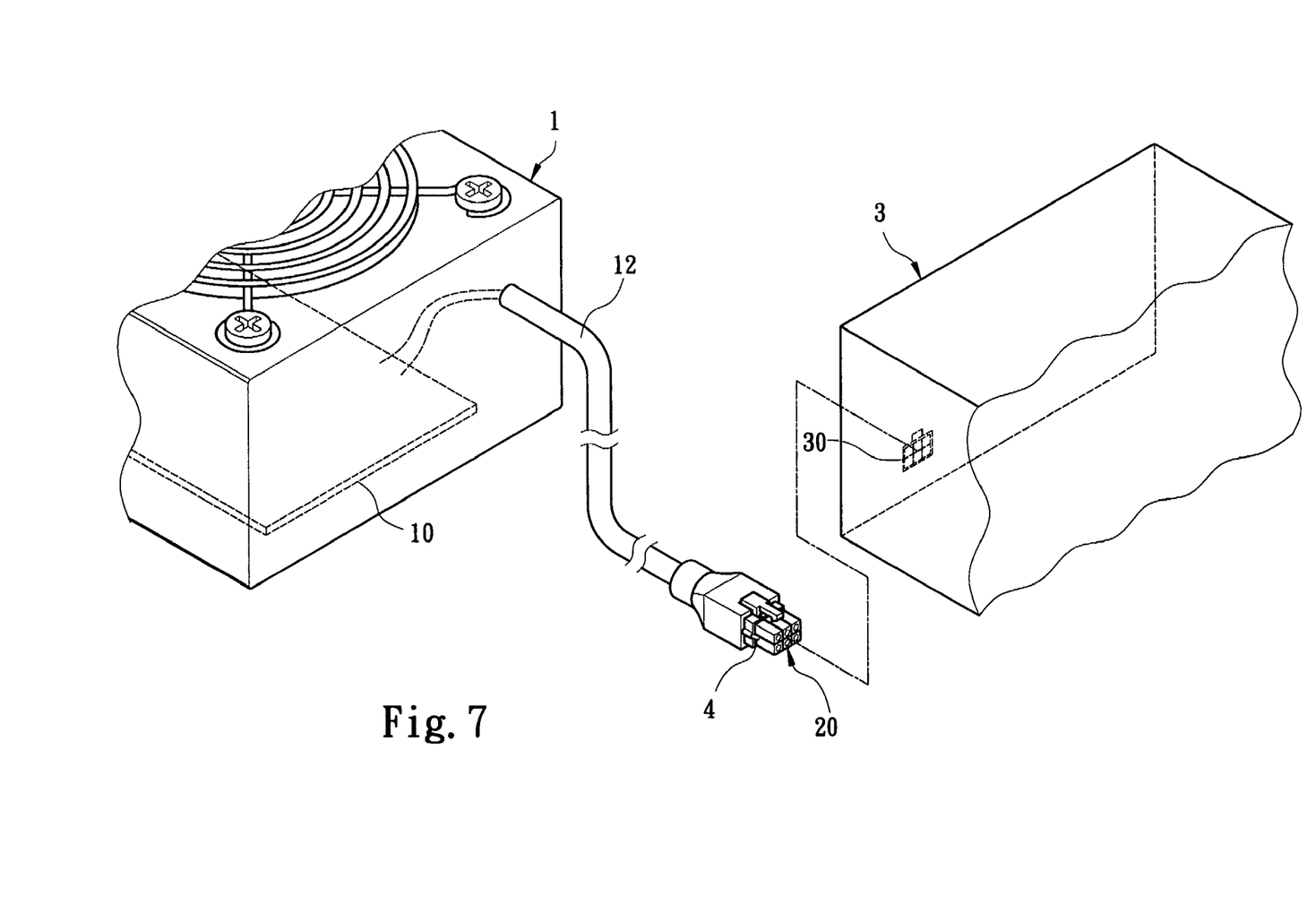
FIG. 7 is a perspective view schematically showing the control element according to a sixth embodiment of the present invention.

Refer to FIG. 7 a perspective view schematically showing a sixth embodiment of the present invention. In this embodiment, the power supply 1 is a conventional one; the first connector 20 is connected to the power supply 1 via a first set of cables 12; the control element 4 also uses the first set of cables 12 to transmit the first signal and the second signal; and the first connector 20 is connected to the corresponding sixth connector 30 on the electronic device 3. In this embodiment, the DC power states of the output signal of the overload protection circuit 10 include: a low-current output state and a high-current output state. When the first signal is input into the overload protection circuit 10, the overload protection circuit 10 presents the first overload protection mechanism, and the first overload protection mechanism is a low overload protection mechanism, and the overload protection circuit 10 provides a low current output. When the second signal is input into the overload protection circuit 10, the overload protection circuit 10 presents the second overload protection mechanism, and the second protection overload protection mechanism is a high overload protection mechanism, and the overload protection circuit 10 provides a high current output. In this embodiment, the low current output is provided by the low overload protection mode, and the high current output is provided by the high overload protection mode.

Therefore, the conventional power supply 1 can be connected to the back-end electronic device 3 without the adapter device 22 mentioned above but via the first set of cables 12 and the connection of the first connector 20 and the sixth connector 30.

Figure 8:
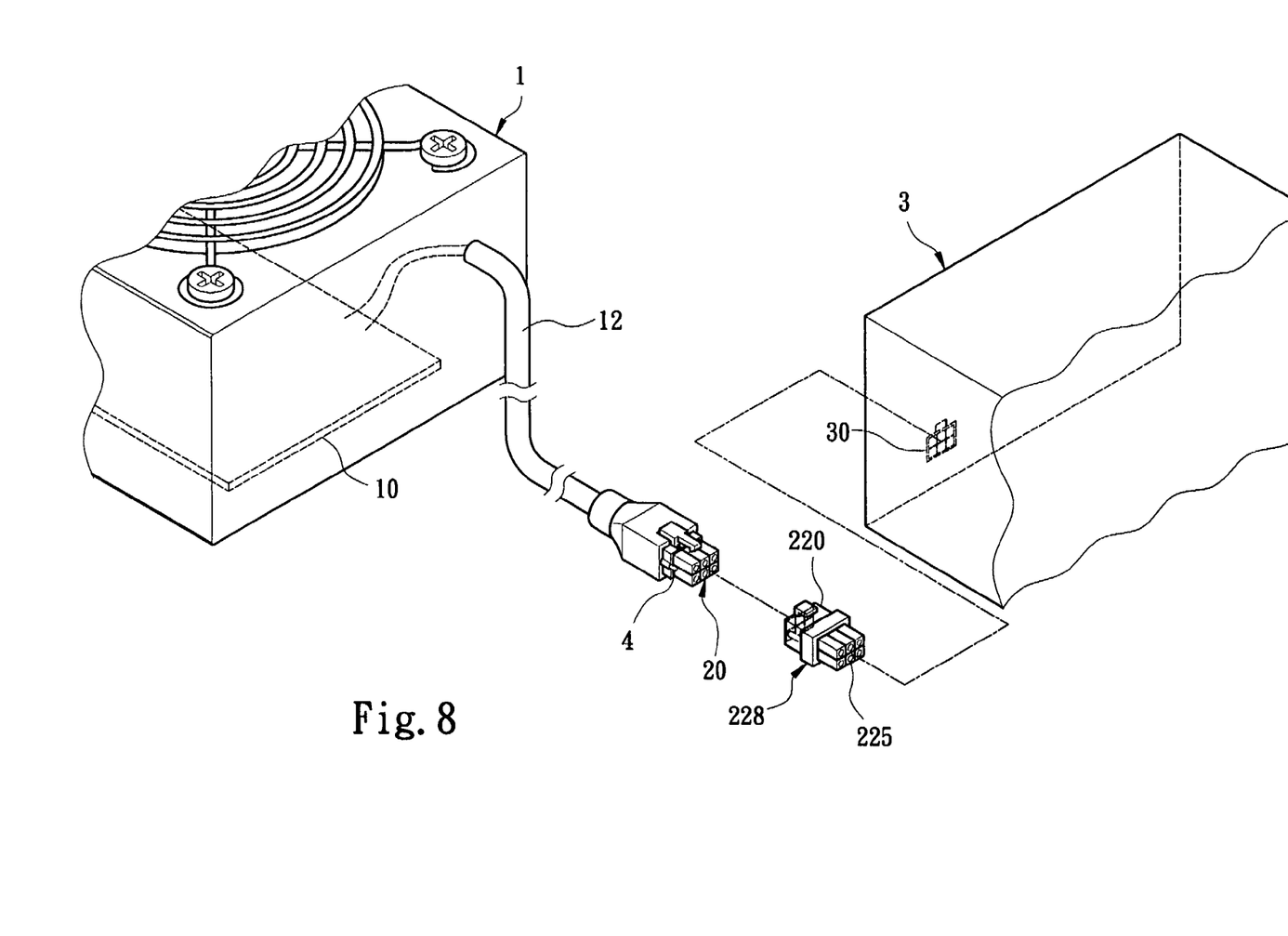
FIG. 8 is a perspective view schematically showing the control element according to a seventh embodiment of the present invention.
Figure 9:
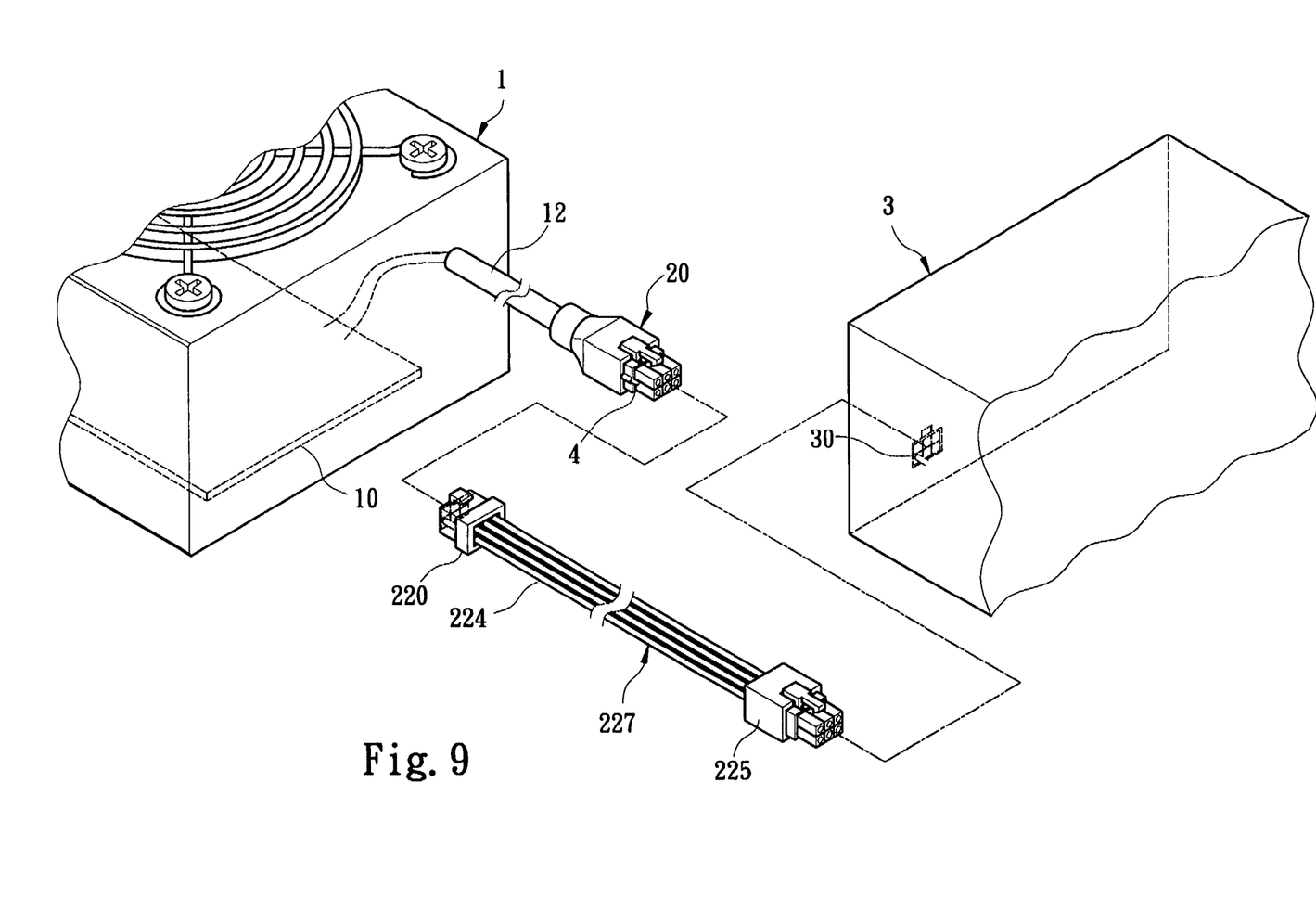
FIG. 9 is a perspective view schematically showing the control element according to an eighth embodiment of the present invention.

Besides, an adapter device may be installed between the first connector 20 and the sixth connector 30, and the adapter device may be an adapter 228 with the second connector 220 and the fifth connector 225 respectively arranged on both ends thereof, as shown in FIG. 8. Further, the adapter device may also be the power line module 227 having the cable 224 with the second connector 220 and the fifth connector 225 respectively arranged on both ends of the cable 224, as shown in FIG. 9. Furthermore, the adapter device may also be the combination of an adapter and a power line module shown in FIG. 6.

In summary, the present invention can automatically output different powers without the judgment and operation of the user but via that the control element 4 triggers the overload protection circuit 10 to switch between the first and second overload protection mechanisms according to the electric connection/disconnection state of the first and second connectors 22 and 220. Thus, the present invention not only can prevent the user, who lacks the knowledge of the overload protection circuit 10, from incorrectly operating the overload protection circuit 10 but also can effectively protect the electronic device 3 from the damage induced by that an unintended touch switches the overload protection circuit 10 erroneously. Further, the adapter device 22 not only connects the modularized power supply 1 or the conventional power supply 1 to the electronic device 3 but also provides the connection/disconnection state of the first connector 20 and the second connector 220 to trigger the control element 4; thereby, the control element 4 can enable the overload protection circuit 10 to switch between the first and second overload protection mechanisms without changing the architecture of the electronic device 3. Therefore, the present invention possesses novelty and non-obviousness and indeed meets the requirements of a patent. Thus, the Inventor files the present invention to apply for the patent. It will be greatly appreciated that the patent of the present invention can be kindly licensed fast.

The present invention has been stated in detail. However, those described above are only the preferred embodiments of the present invention. It is not intended to limit the scope of the present invention. Any equivalent modification and variation according to the spirit of the present invention is to be also included within the scope of the present invention.

What is claimed is:

1. An overload protection control mechanism for a power supply, comprising:
   an overload protection circuit, built inside a power supply and determining the DC power state of its output signal according to the value of the power output by said power supply; and
   a control mechanism, further comprising: a first connector, an adapter device and a control element, wherein said first connector is arranged in the output end of said power supply; said adapter device has a second connector, which can be electrically connected to said first connector, and transmits power to a back-end electronic device; said control element is installed in the place where said first connector is electrically connected to said second connector; said control element generates a first signal when said first connector and said second connector are in an electric connection state and generates a second signal when said first connector and said second connector are in an electric disconnection state; when said first signal is input into said overload protection circuit, said overload protection circuit enters a first overload protection mode; when said second signal is input into said overload protection circuit, said overload protection circuit enters a second overload protection mode.

2. The overload protection control mechanism for a power supply according to claim 1, wherein said control element is a switch device installed in the contact face of said first connector and said second connector; when said control element is free from external force, said control element generates said first signal; when said control element contacts said second connector, said control element generates said second signal.

3. The overload protection control mechanism for a power supply according to claim 2, wherein said switch device further comprises: a movable bar, a spring enabling said movable bar to move back and forth and a switch.

4. The overload protection control mechanism for a power supply according to claim 1, wherein said control element is a switch device installed inside said first connector; when said switch device is free from external force, said switch device generates said first signal; when said switch device is touched by the internal contact face of a second pin corresponding to said first pin and on said second connector, said switch device generates said second signal.

5. The overload protection control mechanism for a power supply according to claim 4, wherein said switch device further comprises a movable bar, a spring enabling said movable bar to move back and forth, and a switch.

6. The overload protection control mechanism for a power supply according to claim 1, wherein the sectional area of said second connector is greater than that of said first connector; a switch device is installed in said first connector and on one side thereof corresponding to the region by which the sectional area of said second connector is greater than that of said first connector; when said switch device is free from external force, said switch device generates said first signal; when said switch device is touched by said second connector, said switch device generates said second signal.

7. The overload protection control mechanism for a power supply according to claim 6, wherein said switch device further comprises a movable bar, a spring enabling said movable bar to move back and forth, and a switch.

8. The overload protection control mechanism for a power supply according to claim 1, wherein in addition to said second connector, said adapter device further comprises a third connector and a cable; said second connector and said third connector are respectively arranged on both ends of said adapter device; said cable is installed between said second connector and said third connector; and said third connector is used to plug in said back-end electronic device.

9. The overload protection control mechanism for a power supply according to claim 1, wherein said adapter device further comprises: an adapter with said second connector and a third connector respectively arranged on both ends thereof, and a power line module having a cable with a fourth connector and a fifth connector respectively arranged on both ends of said cable); said third connector can be connected to said fourth connector, and said fifth connector can be connected to said back-end electronic device.

10. The overload protection control mechanism for a power supply according to claim 1, wherein said first overload protection mode generated via inputting said first signal into said overload protection circuit is related to a normal power output state; and said second overload protection mode generated via inputting said second signal into said overload protection circuit is related to a power pause/turn-off state.

11. The overload protection control mechanism for a power supply according to claim 1, wherein said first overload protection mode generated via inputting said first signal into said overload protection circuit is a low overload protection mode; and said second overload protection mode mechanism generated via inputting said second signal into said overload protection circuit is a high overload protection mode.

12. An overload protection control mechanism for a power supply, comprising:
    an overload protection circuit, built inside a power supply and determining the DC power state of its output signal according to the value of the power output by said power supply; and
    a control mechanism, further comprising: a first connector, a second connector and a control element, wherein said first connector is connected to the output end of said power supply via a first set of cables; said second connector is installed on an electronic device and can be electrically connected to said first connector; said control element is installed in the place where said first connector is electrically connected to said second connector; said control element generates a first signal when said first connector and said second connector are in an electric connection state and generates a second signal when said first connector and said second connector are in an electric disconnection state; when said first signal is input into said overload protection circuit, said overload protection circuit enters a first overload protection mode; when said second signal is input into said overload protection circuit, said overload protection circuit enters a second overload protection mode.

13. The overload protection control mechanism for a power supply according to claim 12, wherein said control element is a switch device installed in the contact face of said first connector and said second connector; when said control element is free from external force, said control element generates said first signal; when said control element contacts a third connector, said control element generates said second signal.

14. The overload protection control mechanism for a power supply according to claim 13, wherein said switch device further comprises a movable bar, a spring enabling said movable bar to move back and forth, and a switch.

15. The overload protection control mechanism for a power supply according to claim 12, wherein said control element is a switch device installed inside said first connector; when said switch device is free from external force, said switch device generates said first signal; when said switch device is touched by the internal contact face of a second pin corresponding to said first pin and on said second connector, said switch device generates said second signal.

16. The overload protection control mechanism for a power supply according to claim 14, wherein said switch device further comprises a movable bar, a spring enabling said movable bar to move back and forth, and a switch.

17. The overload protection control mechanism for a power supply according to claim 12, wherein an adapter device is installed between said first connector and said second connector of said electronic device.

18. The overload protection control mechanism for a power supply according to claim 17, wherein said adapter device further comprises: a third connector, a fourth connector and a second set of cables; said third connector and said fourth connector are respectively arranged on both ends of said adapter device; said second set of cables is installed between said third connector and said fourth connector; said third connector is used to plug in said first connector and said fourth connector is used to plug in said second connector.

19. The overload protection control mechanism for a power supply according to claim 17, wherein said adapter device further comprises: an adapter with a third connector and a fourth connector respectively arranged on both ends thereof; said third connector is used to plug in said first connector, and said fourth connector can be connected to said electronic device.

20. The overload protection control mechanism for a power supply according to claim 17, wherein said adapter device comprises: an adapter with a third connector and a fourth connector respectively arranged on two ends thereof, and a power line module having a cable with a fifth connector and a sixth connector respectively arranged on two ends of the cable, said fourth connector can be connected to said fifth connector, and said sixth connector can be connected to said second connector.

21. The overload protection control mechanism for a power supply according to claim 12, wherein said first overload protection mode generated via inputting said first signal into said overload protection circuit is related to a normal power output state; and said second overload protection mode generated via inputting said second signal into said overload protection circuit is related to a power pause/turn-off state.

22. The overload protection control mechanism for a power supply according to claim 12, wherein said first overload protection mode generated via inputting said first signal into said overload protection circuit is a low overload protection mode; and said second overload protection mode generated via inputting said second signal into said overload protection circuit is a high overload protection mode.

* * * * *